US012800366B2

(12) United States Patent
Tschambser et al.

(10) Patent No.: US 12,800,366 B2
(45) Date of Patent: Nov. 17, 2026

(54) MAGNETO-INDUCTIVE FLOW MEASUREMENT DEVICE

(71) Applicant: Endress+Hauser Flowtec AG, Reinach (CH)

(72) Inventors: Florent Tschambser, Hesingue (FR); Marc Koepke, Basel (CH); Fabian Häuselmann, Aesch (CH); Tulio Paiva Galvao, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 448 days.

(21) Appl. No.: 18/578,890

(22) PCT Filed: Jul. 4, 2022

(86) PCT No.: PCT/EP2022/068422
§ 371 (c)(1),
(2) Date: Jan. 12, 2024

(87) PCT Pub. No.: WO2023/285186
PCT Pub. Date: Jan. 19, 2023

(65) Prior Publication Data

US 2024/0328842 A1 Oct. 3, 2024

(30) Foreign Application Priority Data

Jul. 14, 2021 (DE) ..................... 10 2021 118 264.6

(51) Int. Cl.
*G01F 1/58* (2006.01)
*G01F 1/60* (2006.01)

(52) U.S. Cl.
CPC ................ *G01F 1/588* (2013.01); *G01F 1/60* (2013.01); *G01F 1/58* (2013.01)

(58) Field of Classification Search
CPC ............... G01F 1/588; G01F 1/60; G01F 1/58
(Continued)

(56) References Cited

U.S. PATENT DOCUMENTS

2015/0316399 A1* 11/2015 Graf ........................ G01F 1/586 73/861.12
2017/0097251 A1 4/2017 Dabrowski et al.
(Continued)

FOREIGN PATENT DOCUMENTS

DE 102013112373 A1 5/2015
EP 3171139 A1 5/2017
WO 2014001026 A1 1/2014

*Primary Examiner* — Peter J Macchiarolo
*Assistant Examiner* — John M Royston
(74) *Attorney, Agent, or Firm* — Mark A. Logan; Endress+Hauser (USA) Holding, Inc.

(57) ABSTRACT

A magneto-inductive flow measurement device for determining a flow-rate-dependent measured variable for a flowable medium, comprises a device for producing a magnetic field, the device for producing the magnetic field comprising a coil arrangement; a device for tapping off a measurement voltage induced in the flowable medium, in particular by means of two preferably diametrically arranged measurement electrodes; an operating circuit configured to apply an operating signal, in particular a voltage signal, to the coil arrangement, the operating signal having operating signal parameters; and a controller circuit configured to control at least one of the operating signal parameters in such a way that a controlled variable does not differ from a predefined setpoint value, the setpoint value comprising a magnetic field energy of proportional magnitude.

15 Claims, 3 Drawing Sheets

(58) Field of Classification Search
USPC .......................................................... 73/861.12
See application file for complete search history.

(56) References Cited

U.S. PATENT DOCUMENTS

| | | | |
|---|---|---|---|
| 2017/0146377 | A1 | 5/2017 | Budmiger |
| 2018/0364081 | A1 * | 12/2018 | Fink .......................... G01F 1/60 |
| 2021/0131844 | A1 | 5/2021 | Tschambser et al. |

* cited by examiner

MAGNETO-INDUCTIVE FLOW MEASUREMENT DEVICE

CROSS-REFERENCE TO RELATED APPLICATIONS

The present application is related to and claims the priority benefit of DPMA Patent Application No. 10 2021 118 264.6, filed on Jul. 14, 2021 and International Patent Application No. PCT/EP2022/068422, filed on Jul. 4, 2022, the entire contents of which are incorporated herein by reference.

TECHNICAL FIELD

The invention relates to a magneto-inductive flow measurement device for determining a flow-rate-dependent measured variable for a flowable medium.

BACKGROUND

Magneto-inductive flow measurement devices are used for determining the flow rate and the volumetric flow of a flowing medium in a pipeline. A distinction is made here between in-line magneto-inductive flow meters and magneto-inductive flow measuring probes, which are inserted into a lateral opening of a pipeline. A magneto-inductive flow meter has a device for producing a magnetic field, which produces a magnetic field perpendicularly to the flow direction of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring tube. In addition, a magneto-inductive flow meter has a measuring tube on which the device for producing the magnetic field is arranged. A measurement electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate and, with the inclusion of a known tube cross-section, the volumetric flow can be determined from the induced measurement voltage.

In contrast to a magneto-inductive flow meter, which comprises a measuring tube for conducting the medium with an attached device for generating a magnetic field penetrating the measuring tube and with measuring electrodes, magneto-inductive flow measuring probes are inserted with their usually circular cylindrical housings into a lateral opening of a tube line and fixed in a fluid-tight manner. A special measuring tube is no longer necessary. The measurement electrode arrangement and coil arrangement, mentioned in the introduction, on the lateral surface of the measuring tube are omitted and are replaced by a device for producing a magnetic field, which device is arranged in the interior of the housing and in direct proximity to the measurement electrodes and is designed such that an axis of symmetry of the magnetic field lines of the produced magnetic field perpendicularly intersects the front face or the face between the measurement electrodes. In the prior art, there is already a plurality of different magneto-inductive flow measuring probes.

Magneto-inductive flow measurement devices are often used in process and automation engineering for fluids, starting from an electrical conductivity of approximately 5 μS/cm. Corresponding flow measurement devices are sold by the applicant in a wide variety of embodiments for various fields of application, for example under the name PROMAG or MAGPHANT.

There is a plurality of different methods for controlling the operating signal applied to the coil arrangement. Generally, they aim at producing a magnetic field with a magnetic induction that is as constant as possible over an entire measurement phase. WO 2014/001026 A1, for example, discloses a controller in which a voltage signal applied to the coil arrangement is controlled in such a way that a coil current flowing through the coil arrangement reaches and maintains a coil current setpoint value in a defined measurement phase. The coil current flowing through the coil arrangement produces a magnetic field with a magnetic induction that depends on the coil current. It is basically assumed that by establishing a fixed coil current setpoint value, the magnetic induction of the produced magnetic field also assumes a setpoint value in a reproducible manner. An advantage of such a control is that the control does not require measuring the magnetic induction. However, it has been found that, due to temperature changes and magnetic interference fields, the magnetic induction cannot be reproduced solely by adjustment to a fixed coil current setpoint value. As a result, the value assumed for determining the flow-rate-dependent measured variable for magnetic induction differs from the currently present magnetic induction in the measuring tube. Depending on the disturbance variable, this can lead to deviations of up to 20% when determining the flow-rate-dependent measured variable.

SUMMARY

The object of the invention is to remedy this problem.

The object is achieved by the magneto-inductive flow measurement device according to the present disclosure.

The magneto-inductive flow measurement device according to the invention for determining a flow-rate-dependent measured variable of a flowable medium comprises:

- a device for producing a magnetic field,
  - wherein device for producing the magnetic field comprises a coil arrangement;
- a device for tapping off a measurement voltage induced in the flowable medium, in particular by means of two preferably diametrically arranged measurement electrodes;
- an operating circuit configured to apply an operating signal, in particular a voltage signal, to the coil arrangement,
- wherein the operating signal has operating signal parameters; and
- a controller circuit configured to control at least one of the operating signal parameters in such a way that a controlled variable does not differ from a predefined setpoint value,
- wherein the setpoint value comprises a magnetic field energy of proportional magnitude.

Magneto-inductive flow measurement devices with such a controller circuit show greater insensitivity to external interference fields and a temperature-dependent self-induction of the device for producing a magnetic field. The controller circuit according to the invention is particularly advantageous when used in magneto-inductive flow measurement devices that are supplied via an electrochemical storage, for example batteries or accumulators. They are operated with a significantly lower current or a significantly lower voltage than conventional magneto-inductive flow measurement devices that are supplied via a power supply. This means that the field-conducting components, such as the coil core or the field-conducting plates, do not go into magnetic saturation during use. As a result, in addition to a particularly increased sensitivity to external interference fields, they also have an extended settling time during startup, wherein the settling time describes the period to be waited after the flow measurement device has been switched on until the device for producing the magnetic field is warmed up and in which the magnetic induction continuously settles toward the setpoint value. Magneto-inductive flow measurement devices with the controller circuit according to the invention moreover have a significantly lower temperature coefficient of the magnetic field, wherein the temperature coefficient describes the deviation of the magnetic field per temperature change.

The setpoint value determined and provided at the factory or during startup can be determined in an adjustment method or by computer simulation.

The setpoint value comprises a variable which is proportional to the magnetic field energy of the device for producing the magnetic field. This means that the setpoint value comprises the unit of a magnetic field energy. The magnetic field energy of a coil arrangement depends, for example, on the self-induction L of the coil and a quadratic contribution of the coil current currently flowing through the coil arrangement.

Advantageous embodiment of the invention are the subject matter of the dependent claims.

One embodiment provides for the magneto-inductive flow measurement device to further comprise:

a measuring circuit configured to determine a coil current of the coil arrangement, wherein the device for producing a magnetic field has a self-induction, wherein the controlled variable depends on a product of a self-induction value of the self-induction and of a square of a coil current value of the coil current.

The sensitivity of the magneto-inductive flow measurement device to interference fields and temperature influences is reduced by controlling the at least one operating signal parameter as a function of the function that depends on the self-induction value and a square of the coil current value. A further reduction in sensitivity can be achieved in that the function is selected such that it depends on a product of the self-induction value and the square of the coil current value. According to one embodiment, the function depends solely on the product of the self-induction value and the square of the coil current and optionally a constant prefactor. Dependence is essentially always described by a linear relationship.

One embodiment provides for the operating signal to have a voltage curve which is in particular variable over time and is divided into time intervals, wherein a sign of the voltage curve alternates in consecutive time intervals, wherein the time intervals each have a first time subinterval in which a first voltage, which is in particular constant over the entire first time subinterval, is applied to the device for producing the magnetic field.

One embodiment provides for the measuring circuit to be configured to measure the coil current value during the first time subinterval, wherein the controlled operating signal parameter comprises a function that depends on the first voltage in particular on a square of the first voltage, or wherein the first voltage is in particular the square of the first voltage.

Depending on the coil current value determined in the first time interval, a time constant can be determined which is a characteristic variable and which depends at least on an electrical resistance and on the self-induction of the device for producing the magnetic field. A single coil current value, at least two coil current values, or a coil current value course formed by coil current values can enter into the determination of the time constant, wherein a time value is assigned to each of the coil current values.

The controller circuit is configured to control the first voltage or a square of the first voltage such that a control function dependent on the determined time constant and on the first voltage or on a function dependent on the first voltage does not differ from the predefined setpoint value. In particular, according to an advantageous embodiment, the function introduced above depends solely on the product of the time constant and the first voltage or the function dependent on the first voltage. The time constant characterizes the rise in the coil current. For example, the time constant can be defined such as to describe the corresponding duration after switching of the coil current direction until the coil current assumes a predefined setpoint coil current value. The time constant depends on external magnetic fields and changes in the electrical coil resistance.

The time constant can be determined from the rise in coil current after application or switching of the coil voltage. For this purpose, for example, the generally non-linear temporal course of the coil current after the change in coil voltage can be fitted with a fit function, and the time constant can be determined taking into account the electrical coil resistance and the coil voltage. The fit function has an exponential function with an exponent having the time constant. Alternatively, the period of time needed until the coil current assumes a predefined coil current setpoint value can be determined, and the time constant can be ascertained as a function of said period of time. The product of the time constant and the first voltage is equal to the product of the self-induction and the coil current. Therefore, depending on the determined time constant, the first voltage or the square of the first voltage is controlled such that a product of the time constant and of the first voltage or the square of the first voltage is constant.

One embodiment provides for the time intervals to each have a second time subinterval in which a second voltage, which is in particular constant over the second time subinterval, is applied to the device for producing the magnetic field, wherein the second voltage is greater than the first voltage, wherein the first time subinterval follows the second time subinterval in the voltage curve, wherein a duration of the second time subinterval is shorter than a duration of the first time subinterval.

One embodiment provides for a quotient of the first voltage and the second voltage to be constant over the voltage curve, wherein the controlled operating signal parameter comprises, in particular, solely the duration of the second time subinterval and a function dependent on the first voltage in particular on a square of the first voltage, wherein the duration of the second time subinterval is a variable and controllable variable, wherein the controller circuit is configured to control the duration of the second time subinterval and the function that depends on the first voltage such that a control function does not differ from the predefined setpoint value, wherein the control function depends on a product of the duration of the second time subinterval and the function dependent on the first voltage in particular on the square of the first voltage.

By determining the quotient of the first voltage and the second voltage, a simplified control results. The reduction in sensitivity to interference fields and temperature influences was possible to achieve by determining, as an operating signal parameter, the function dependent on the product of the duration of the second time subinterval and on the first voltage. A magneto-inductive flow measurement device with particularly high insensitivity and fast reaction time was possible to achieve in particular by controlling the variable and controllable duration of the second time subinterval and of the first voltage, in particular the function dependent on the first voltage and preferably the square of the first voltage such that the product between the two parameters is constant. In addition, continuous monitoring of the self-induction is not necessary. It has been found that as a result of the embodiment according to the invention, in which the function dependent on the product of the duration of the second time subinterval and on the first voltage is kept constant or is adjusted to the setpoint, the function dependent on the self-induction value of the self-induction and on the coil current value of the coil current or its product remains constant as well. Since the quotient of the first voltage and second voltage is constant, the function dependent on the first voltage is to be equated with a function dependent on the second voltage.

The controller circuit is configured to control the duration of the second time subinterval such that at a defined point in time, for example the beginning of the measurement phase in which the induced measurement voltage is determined, or in a time segment the difference between a test variable and a test setpoint value is minimal. The test variable can be a measured value of the coil current, a sum or an integral over a course of the coil current or a function dependent on the coil current. The test setpoint value for the different time subintervals can vary. Alternatively, the controller circuit can be designed and configured to control the duration of the second time subinterval such that a duration of the coil current settling after the beginning of the first time subinterval is minimal.

One embodiment provides for the function dependent on the first voltage in particular on the square of the first voltage to be inversely proportional to the duration of the second time subinterval.

This can be achieved by simultaneously controlling the duration of the second time subinterval and controlling the first voltage or the square of the first voltage.

One embodiment provides for the second voltage to be constant over the time intervals, wherein the at least one controlled operating signal parameter comprises the duration of the second time subinterval and a function dependent on the first voltage in particular on a square of the first voltage, wherein the controller circuit is configured to control the duration of the second time subinterval and the function that depends on the first voltage in particular on the square of the first voltage such that a control function does not differ from the predefined setpoint value, wherein the control function depends on a product of the function dependent on the first voltage in particular on the square of the first voltage, and the duration of the second time subinterval.

The control function can moreover depend on a maximum coil current value of the second time subinterval and a coil current value determined during the first time subinterval. The controller circuit is configured to control the duration of the second time subinterval and the first voltage, in particular the function dependent on the first voltage, and preferably the square of the first voltage such that the control function does not differ from the predefined setpoint value. It is thus achieved that the function dependent on the self-induction value of the self-induction and on the coil current value of the coil current or on the product thereof also assumes the predefined setpoint value in the measurement phase.

One embodiment provides for the function dependent on the first voltage in particular on the square of the first voltage to be inversely proportional to the duration of the second time subinterval, wherein the function dependent on the first voltage in particular on the square of the first voltage also depends on ln $((U_{shot}+U_{hold})/(U_{shot}-U_{hold}))$, is, in particular, proportional.

The second voltage can be selected to be constant or at a constant ratio to the first voltage. According to a preferred embodiment, however, the second voltage is a controllable variable. For example, the second voltage may be controlled such that the duration of the second time subinterval is as small as possible, i.e., the duration until the magnetic field assumes a steady state is as short as possible.

One embodiment provides for a coil current to assume a maximum coil current value in the time interval in particular in the first time subinterval, wherein a quotient of the maximum coil current value and of a coil current value determined during the first time subinterval is constant.

This embodiment simplifies the control since, in addition to the constant second voltage, the quotient of the maximum coil current value and of the coil current value determined during the first time subinterval is kept constant. For this purpose, the coil current is determined via a measuring circuit and provided to the controller circuit.

One embodiment provides for a coil current to assume a maximum coil current value in the time interval in particular in the first time subinterval, wherein the at least one controlled operating signal parameter comprises the duration of the second time subinterval and a function that depends on the first voltage in particular on a square of the first voltage, wherein the controller circuit is configured to control the duration of the second time subinterval and the function that depends on the first voltage in particular on the square of the first voltage such that a control function does not differ from the setpoint value, wherein the control function depends on a product of the duration of the second time subinterval and the function dependent on the first voltage and the maximum coil current value.

One embodiment provides for the duration of the second time subinterval, a function dependent on the first voltage in particular on a square of the first voltage, and for a function dependent on the second voltage to be a variable and controllable variable in each case, wherein the controller circuit is configured to control the duration of the second time subinterval the function dependent on the first voltage in particular on the square of the first voltage and the function dependent on the second voltage such that a control function does not differ from the predefined setpoint value, wherein the control function depends on the function dependent on the first voltage in particular on the square of the first voltage, on the function dependent on the second voltage and on the duration of the second time subinterval.

One embodiment provides for the function dependent on the first voltage to comprise a product of the first voltage and the coil current value.

In this case, the first voltage is controlled such that a product of the duration of the second time subinterval, the measured coil current value and the first voltage is constant.

One embodiment provides for the magneto-inductive flow measurement device to comprise:

an evaluation circuit which is configured to determine an actual value of a function that depends on the self-induction value.

It can thus be checked whether the function dependent on the self-induction value of the self-induction and on the square of the coil current value of the coil current does not differ from the predefined setpoint value.

The actual value of the function dependent on the self-induction value can be determined, for example, from the rise of the coil current around the coil current zero point. In this case, the electrical resistance is approximately zero, and thermal influences are negligible. In order to avoid eddy current effects, the actual value of the function dependent on the self-induction value can be determined in a time segment in which the coil current overshoots due to the switchover or change of the coil voltage and then decreases. During the overshoot, the temporal change in eddy currents is low.

The function dependent on the self-induction value can, for example, be the self-induction of the device for producing the magnetic field.

One embodiment provides for the measuring circuit to be configured to determine a present actual value of an applied coil voltage at the device for producing the magnetic field, wherein the present actual value of the applied coil voltage, in particular a square of the present actual value of the applied coil voltage, enters the control function.

A comparison of the controlled first voltage and the coil voltage actually applied to the coil results in the accuracy of the magneto-inductive flow measurement device being further improved. Thus, the first voltage is not controlled blindly, which results in that, for example, age-related effects on the device for producing the magnetic field can be compensated by the control.

One embodiment provides for the measuring circuit to be configured to determine a present actual value of an electrical resistance of the device for producing the magnetic field, wherein the control function comprises a function dependent on the square of the first voltage and on the actual value of the electrical resistance, in particular on a quotient of the square of the first voltage and of the actual value of the electrical resistance.

One embodiment provides for the controller circuit to be configured to, if the actual value differs from the setpoint value in a time interval $t_N$, change the second voltage such that a departure from the setpoint value is smaller in a temporally subsequent time interval $t_{N+M}$, wherein N is a natural number, and M≥1, in particular M=1 or M=2.

One embodiment provides for the controller circuit to be configured to, if the actual value differs from the setpoint value in a time interval $t_N$, change the first voltage such that the departure from the setpoint value is smaller in a temporally subsequent time interval $t_{N+M}$, wherein N is a natural number, and M≥1, in particular M=1 or M=2.

One embodiment provides for the controller circuit to be configured to, if the actual value differs from the setpoint value in a time interval $t_N$, change a quotient of the first voltage and of the second voltage such that the difference is smaller in a temporally subsequent time interval $t_{N+M}$, wherein N is a natural number, and M≥1, in particular M=1 or M=2.

One embodiment provides for the controller circuit to be configured to, if a coil test current value or a test variable dependent on the coil test current value differs from the setpoint value in a time interval ty, change the duration of the second time interval such that the difference is smaller in a temporally subsequent time interval $t_{N+M}$, wherein N is a natural number, and M≥1, in particular M=1 or M=2.

One embodiment provides for the magneto-inductive flow measurement device to be designed as a magneto-inductive flow meter, comprising a measuring tube for conducting the flowable medium, wherein the device for producing the magnetic field is arranged on an outer surface of the measuring tube.

One embodiment provides for the magneto-inductive flow measurement device to be designed as a magneto-inductive flow measuring probe to be introduced into a lateral opening of a pipeline, comprising a housing to be supplied with the medium, wherein the device for tapping off the measurement voltage induced in the flowable medium is arranged in a receptacle provided for this purpose in the housing, wherein the device for producing the magnetic field is arranged in the housing.

The present disclosure is explained in greater detail with reference to the following figures. In the figures.

DETAILED DESCRIPTION

Figure 1:
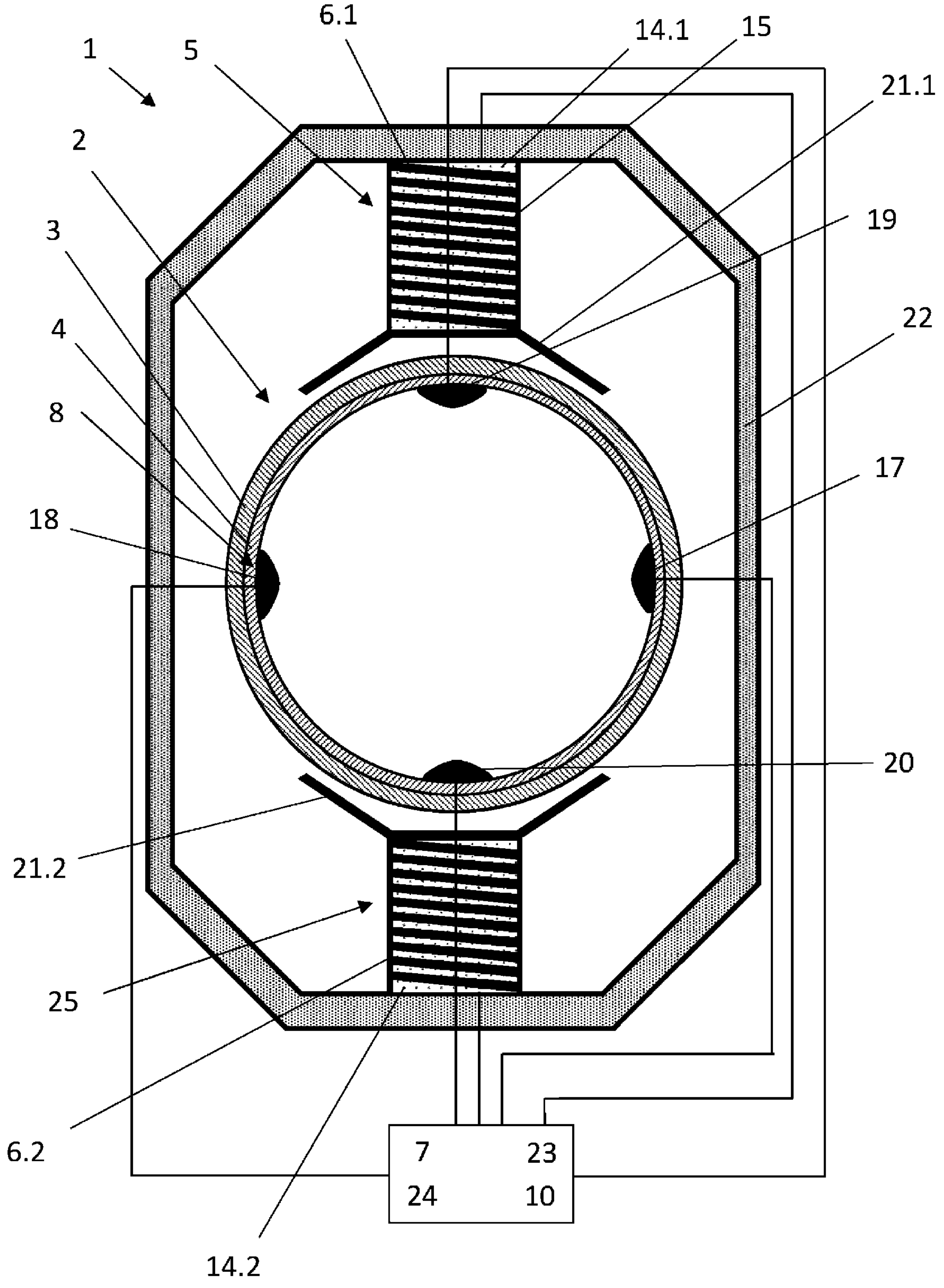
FIG. 1 shows an embodiment of the magneto-inductive flow meter according to the present disclosure.

FIG. 1 shows a cross-section of an embodiment of the magneto-inductive flow meter 1 according to the invention. The structure and measuring principle of a magneto-inductive flow meter 1 are known in principle. A flowable medium having an electrical conductivity is conducted through a measuring tube 2. The measuring tube 2 comprises a carrier tube 3, which is usually formed of, or at least comprises, steel, ceramic, plastic or glass the same. A device 5 for producing a magnetic field is arranged on the carrier tube 3 such that the magnetic field lines are oriented substantially perpendicularly to a longitudinal direction defined by the measuring tube axis. The device 5 for producing the magnetic field comprises a saddle coil or a coil 6. A coil core 14 usually extends through a receptacle 15 of the coil 6. The receptacle 15 is understood to mean the volume limited by the coil wire forming the coil 6. The receptacle 15 of the coil 6 can thus be formed by a coil holder or by the imaginary enclosed volume. The latter occurs when the coil wire of the coil 6 is wound directly around the coil core 14. The coil core 14 is formed from a magnetically conductive, in particular soft magnetic material. The device 5 for producing the magnetic field comprises a pole shoe 21 which is arranged at one end of the coil core 14. The pole shoe 21 can be a separate component or can be monolithically connected to the coil core 14. In the depicted embodiment of FIG. 1, two diametrically arranged coils 6.1, 6.2 each have a coil core 14.1, 14.2 and a pole shoe 21.1, 21.2. The two coil cores 14.1, 14.2 are connected to one another via a field return 22. The field return 22 connects the sides of the coil cores 14.1, 14.2 facing away from one another in each case. However, magneto-inductive flow meters having exactly one coil having a coil core and without a field return are also known. The coil 6 is connected to an operating circuit 7 which operates the coil 6 with an operating signal. The operating signal can be a voltage with a time-variable curve and is characterized by operating signal parameters, wherein at least one of the operating signal parameters is controllable. The magnetic field built up by the device 5 for producing the magnetic field is produced by a direct current of alternating polarity clocked by means of an operating circuit 7. This ensures a stable zero point and makes the measurement insensitive to influences due to electrochemical disturbances. The two coils 6.1, 6.2 can be connected separately to the operating circuit 7 or connected in series or parallel to one another.

When the magnetic field is applied, a flow-dependent potential distribution results in the measuring tube 2, which potential distribution can be detected, for example, in the form of an induced measurement voltage. A device 8 for tapping off the induced measurement voltage is arranged on the measuring tube 2. In the embodiment shown, the device 8 for tapping off the induced measurement voltage is formed by two oppositely arranged measurement electrodes 17, 18 to form a galvanic contact with the medium. However, what is also known are magneto-inductive flow meters which comprise measurement electrodes arranged on the outer wall of the carrier tube 3 that are not in contact with a medium. The measurement electrodes 17, 18 are generally arranged diametrically and form an electrode axis, or are intersected by a transverse axis which runs perpendicularly to the magnetic field lines and the longitudinal axis of the measuring tube 2. However, what is also known are devices 8 for tapping off the induced measurement voltage which have more than two measurement electrodes. The flow-rate-dependent measured variable can be determined on the basis of the measured measurement voltage. The flow-rate-dependent measured variable comprises the flow rate, the volume flow, and/or the mass flow of the medium. A measuring circuit 8 is configured to detect the induced measurement voltage applied to the measurement electrodes 17, 18, and an evaluation circuit 24 is designed to determine the flow-rate-dependent measured variable.

The carrier tube 3 is often formed from an electrically conductive material such as steel. In order to prevent the measurement voltage applied to the first and second measurement electrodes 2, 3 from being conducted away via the carrier tube 3, the inner wall is lined with an insulating material, for example a (plastic) liner 4.

Commercially available magneto-inductive flow meters have two further electrodes 19, 20 in addition to measurement electrodes 17, 18. For one thing, a fill-level monitoring electrode 19 attached ideally at the highest point in the measuring tube 2 serves to detect partial filling of the measuring tube 1 and is configured to pass this information to the user and/or to take into account the fill level when determining the volume flow. Furthermore, a reference electrode 20, which is usually attached diametrically to the fill-level monitoring electrode 19 or at the lowest point of the measuring tube cross-section, serves to establish a controlled electric potential in the medium. Generally, the reference electrode 20 is used to connect the flowing medium to a ground potential.

The operating circuit 7, controller circuit 10, measuring circuit 23 and evaluation circuit 24 can be part of a single electronic circuit or can form individual circuits.

Figure 2:
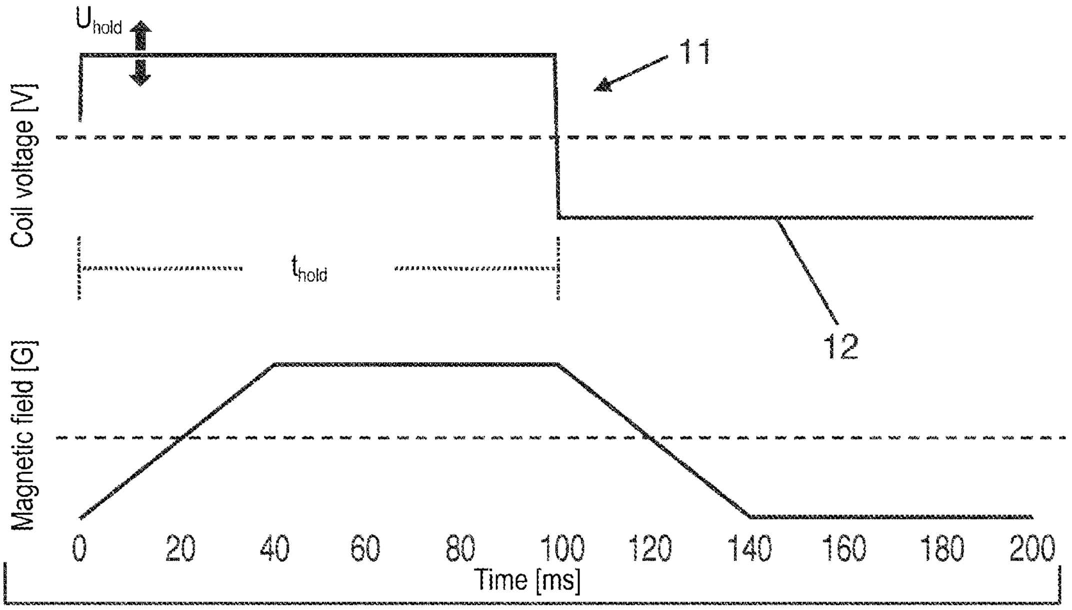
FIG. 2 shows a first embodiment of the course of the voltage and the correspondingly produced magnetic field through the coil arrangement.
Figure 3:
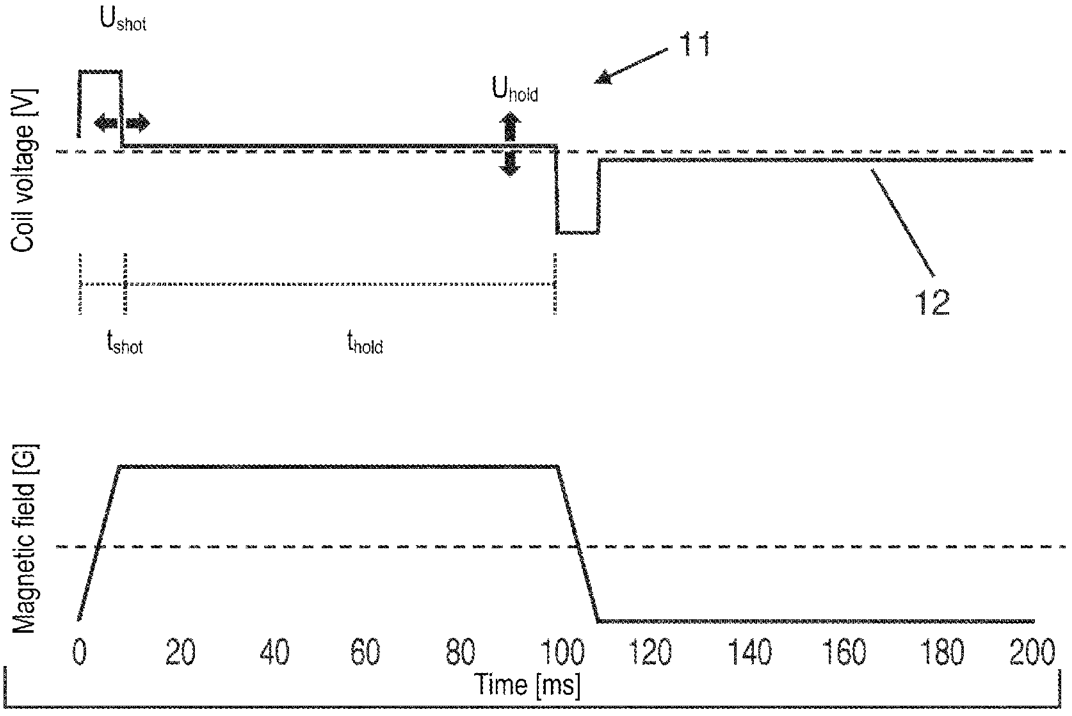
FIG. 3 shows a second embodiment of the course of the voltage and the correspondingly produced magnetic field through the coil arrangement.

The operating circuit 7 is configured to apply a first voltage for a first time subinterval and a second voltage for a second time subinterval to the coil arrangement. The second voltage is greater than the first voltage. In addition, in a single time interval, the first time subinterval follows the second time subinterval. The duration of the first time subinterval is greater than the duration of the second time subinterval. The duration of the second time subinterval is a controllable variable. So is the first voltage. FIGS. 2 and 3 show possible embodiments of the operating signal.

According to the invention, the controller circuit 10 is configured to control one of the operating signal parameters of the operating signal such that a function dependent on the self-induction value of the self-induction and on the square of the coil current value of the coil current does not differ from a predefined setpoint value. The controller circuit 10 is preferably configured to control one of the operating signal parameters such that a product of the self-induction value and of the square of the coil current value does not differ from a predefined setpoint value. For this purpose, the first voltage or the square of the first voltage, and the duration of the second time subinterval are controlled such that a variable dependent on the first voltage and on the duration of the second time subinterval does not differ from the setpoint value. In case of a difference, due to magnetic interference fields or temperature influences, the two control parameters are adjusted until the difference is minimal again. The duration of the second time subinterval is controlled such that a change in the coil current is as low as possible in a measurement phase, i.e., such that the magnetic field in the measurement phase has settled. A change in the self-induction of the device for producing the magnetic field results in a change in the rise of the coil current when the second voltage is applied. Adjustment of the duration of the second time subinterval is reacted to by controlling the first voltage such that the controlled variable assumes the setpoint value.

FIG. 2 shows a first embodiment of the operating signal and the correspondingly produced magnetic field through the coil. According to the invention, the operating signal comprises a voltage with a time-variable curve 12 which is divided into time intervals t. The sign of the applied voltage changes in successive time intervals t. The operating signal shown in FIG. 2 comprises time intervals t, each having a first time subinterval $t_{hold}$ in which a substantially constant first voltage $U_{hold}$ is applied to the coil arrangement over the entire duration of the first time subinterval $t_{hold}$. The detected measurement voltage induced for determining the flow-rate-dependent measured variable is determined in the first time subinterval $t_{hold}$. According to the first embodiment, the controller circuit is configured to control the first voltage $U_{hold}$ of a time interval t such that a function that depends on a self-induction value of self-induction L and on a square of the coil current value of the coil current I, in particular on a product of the two values mentioned, does not differ from a predefined setpoint value. According to the invention, the first voltage $U_{hold}$ is a time-variable and controllable variable. The rise in the coil current is characterized by a time constant which can be determined via a measuring circuit. The first voltage $U_{hold}$ can be controlled such that a variable dependent on the product of the time constant and on the first voltage $U_{hold}$, in particular on the square of the first voltage $U_{hold}$, does not differ from the predefined setpoint value. It is thus ensured that the controlled variable does not differ from the setpoint value, wherein the setpoint value has the unit of a magnetic field energy.

FIG. 3 shows a second embodiment of the operating signal and the produced magnetic field through the device for producing the magnetic field. According to the invention, the operating signal comprises a voltage with a time-variable curve 12 which is divided into time intervals t. The sign of the applied voltage changes in successive time intervals t. The operating signal shown in FIG. 2 comprises time intervals t, each having a first time subinterval $t_{hold}$ in which a constant first voltage $U_{hold}$ is applied to the coil over the entire duration of the first time subinterval $t_{hold}$. The detected measurement voltage induced for determining the flow-rate-dependent measured variable is determined in the first time subinterval $t_{hold}$. In addition, the time intervals t each have a second time subinterval $t_{shot}$ in which a second voltage $U_{shot}$ that is, in particular, constant over the entire duration of the second time subinterval $t_{shot}$ is applied to the coil. The second voltage $U_{shot}$ is greater than the first voltage $U_{hold}$. The first time subinterval $t_{hold}$ follows the second time subinterval $t_{shot}$ in the voltage curve. In addition, the duration of the second time subinterval $t_{shot}$ is less than the duration of the first time subinterval $t_{hold}$. The duration of the second time subinterval $t_{shot}$ is time-variable and controllable. So is the first voltage $U_{hold}$.

The first voltage $U_{hold}$ and the second voltage $U_{shot}$ can be set such that a ratio between the first voltage $U_{hold}$ and the second voltage $U_{shot}$ is constant over the entire curve 12. This means that when controlling the first voltage $U_{hold}$, the second voltage $U_{shot}$ is also automatically adjusted proportional to change. Alternatively, the second voltage $U_{shot}$ can assume a constant value over the entire curve 12. In this case, the function dependent on the first voltage ($U_{hold}$), in particular on the square of the first voltage ($U_{hold}$), is inversely proportional to the duration of the second time subinterval ($t_{shot}$), and the function dependent on the first voltage ($U_{hold}$), in particular on the square of the first voltage ($U_{hold}$), is likewise dependent on ln $(U_{shot}+U_{hold})/(U_{shot}-U_{hold})$ or is proportional thereto.

According to an advantageous embodiment, the second voltage $U_{shot}$ can also be a controllable variable. In addition to controlling the first voltage $U_{hold}$, the duration of the second time subinterval $t_{shot}$ is controlled such that a determined value of a variable dependent on a test variable assumes a test setpoint value within the duration of the second time subinterval $t_{shot}$. The variable can be, for example, a sum or an integral of the measured values of the test variable for a predefined time segment. The two control parameters are controlled such that a function dependent on the product of the first voltage $U_{hold}$ or square of the first voltage $U_{hold}$ and the duration of the second time subinterval $t_{shot}$ does not differ from the predefined setpoint value. The function dependent on the first voltage $U_{hold}$ is inversely proportional to the duration of the second time subinterval $t_{shot}$. The test variable may be a measured value of the coil current, a time profile of a coil current, and/or a variable dependent thereon.

The controller circuit is configured to, if a coil test current value or a test variable dependent on the coil test current value differs from a setpoint value in a time interval ty, change the duration of the second time subinterval $t_{shot}$ such that the difference is smaller in a temporally subsequent time interval $t_{N+M}$, wherein M≥1. The controller circuit is also configured to, if the actual value differs from a setpoint value in a time interval ty, change the first voltage $U_{hold}$ or the square of the first voltage $U_{hold}$ such that the departure from a setpoint value is smaller in a temporally subsequent time interval $t_{N+M}$, wherein M≥1. However, at least one of the conditions listed above must be met. The controller circuit can be configured to control further variables and/or functions.

According to a further embodiment, a measuring circuit is configured to determine, in the first time subinterval $t_{hold}$, a maximum coil current value $I_{max}$ and to control the function which depends of the duration of the second time subinterval $t_{shot}$ and the first voltage $U_{hold}$, in particular the square of the first voltage $U_{hold}$ such that a control function does not differ from the predefined setpoint value, wherein the control function depends on a product of the duration of the second time subinterval $t_{shot}$ and the function which is dependent on the first voltage $U_{hold}$ and the maximum coil current value $I_{max}$.

Alternatively, the controller circuit can be configured to control at least one of the operating signal parameters such that a control variable dependent of a quotient of the maximum coil current value $I_{max}$ and of a coil current value $I_{hold}$ determined during the first time subinterval $t_{hold}$ is constant over the operating signal.

Alternatively, the duration of the second time subinterval ($t_{shot}$), a function dependent on the first voltage ($U_{hold}$), in particular on a square of the first voltage ($U_{hold}$), and a function dependent on the second voltage ($U_{shot}$) are each a variable and controllable variable. In this case, the controller circuit is configured to control the duration of the second time subinterval ($t_{shot}$), the function that depends on the first voltage ($U_{hold}$), in particular on the square of the first voltage ($U_{hold}$), and the function that depends on the second voltage ($U_{shot}$) such that a control function does not differ from the predefined setpoint value. The control function depends on the function dependent on the first voltage ($U_{hold}$), in particular on the square of the first voltage ($U_{hold}$), on the function dependent on the second voltage ($U_{shot}$) and on the duration of the second time subinterval ($t_{shot}$). The function dependent on the first voltage ($U_{hold}$) can comprise a product of the first voltage ($U_{hold}$) and the coil current value.

Alternatively or additionally, the evaluation circuit can be configured to determine an actual value of a function that depends on the self-induction value. If the actual value of the self-induction is known, the controlled variable can be determined taking into account the coil current, in particular the square of the coil current. If it differs from the setpoint value, the first voltage $U_{hold}$, in particular the square of the first voltage $U_{hold}$ and/or the duration of the second time subinterval $t_{shot}$ is adjusted.

Alternatively or additionally, the measuring circuit can be configured to determine a present actual value of an applied coil voltage at the device (5) for producing the magnetic field. Said value then enters the control function. Thus, an electrical voltage is not only applied blindly to the coil arrangement, but is also monitored.

Alternatively or additionally, the measuring circuit can be configured to determine a present actual value of an electrical resistance of the device (5) for producing the magnetic field. In that case, the control function comprises a function dependent on the square of the first voltage ($U_{hold}$) and on the actual value of the electrical resistance, in particular on a quotient of the square of the first voltage ($U_{hold}$) and of the actual value of the electrical resistance. If the electrical resistance changes, for example, due to aging of the coil arrangement or a change in the temperature of the device for producing the magnetic field, the first voltage $U_{hold}$ and/or the duration of the second time subinterval $t_{shot}$ must be readjusted.

The two curves shown in FIG. 3 are highly simplified schemes. The magnetic field settles generally after the second time subinterval.

Figure 4:
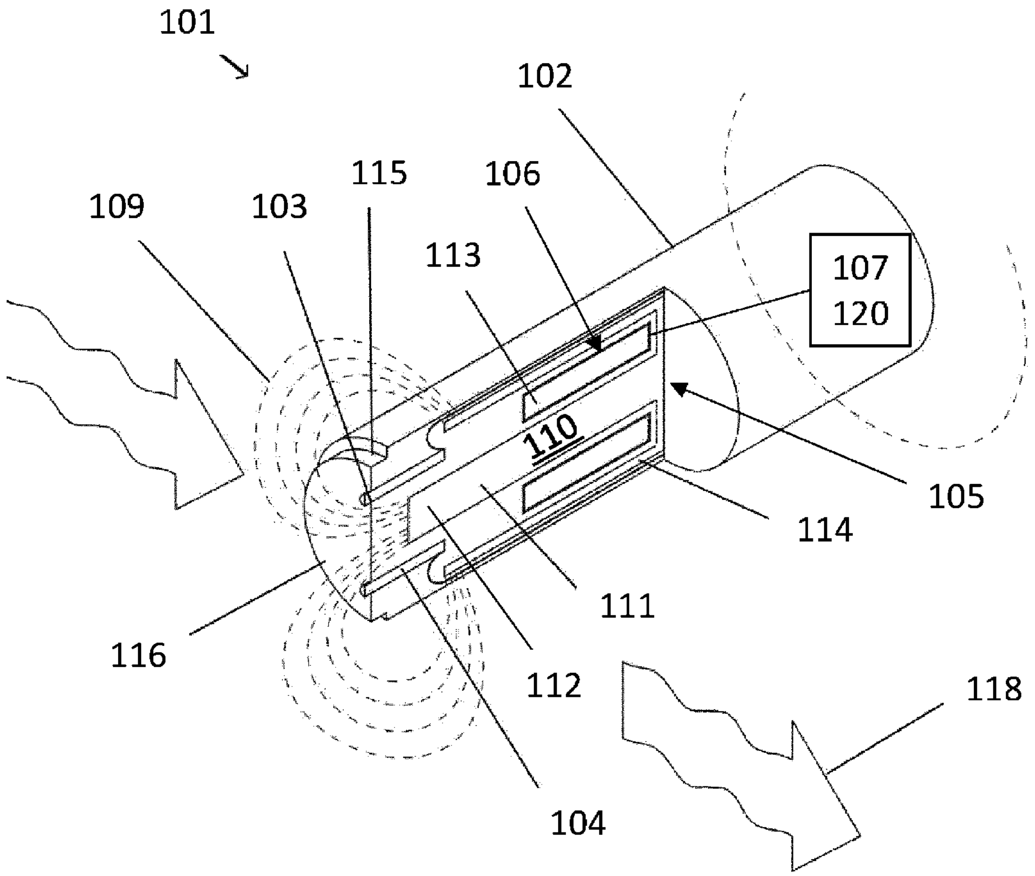
FIG. 4 shows a perspective view of a partially sectioned embodiment of a magneto-inductive flow measuring probe according to the present disclosure.

First, the measuring principle on which the invention is based is explained on the basis of the perspective and partially sectional illustration of FIG. 4. A flow measuring probe 101 comprises a generally circular cylindrical housing 102 having a predefined outer diameter. Said housing is adapted to the diameter of a bore, which is located in a wall of a tube line (not shown in FIG. 4) into which the flow measuring probe 101 is inserted in a fluid-tight manner. A medium to be measured flows in the tube line, and the flow measuring probe 101 is immersed into said medium practically perpendicularly to the flow direction of the medium, which is indicated by the wavy arrows 118. A front end 116 of the housing 102 that projects into the medium is sealed in a fluid-tight manner with a front body 115 made of insulating material. By means of a coil arrangement 106 arranged in the housing 102, a magnetic field 109 that extends through the end portion into the medium can be produced. A coil core 111, which at least partially consists of a soft magnetic material and is arranged in the housing 102, terminates at or near the end portion 116. A field return body 114 that surrounds the coil arrangement 106 and the coil core 111 is configured to return, into the housing 102, the magnetic field 109 extending through from the end portion. The coil core 111, the pole shoe 112 and the field return body 114 are each field-conducting bodies 110, which together form a field-conducting arrangement 105. First and a second measurement electrodes 103, 104 forming a galvanic contact with the medium to be conducted form the device for detecting a measurement voltage induced in the medium and are arranged in the front body 115 and, like the outer walls of the housing, touch the medium. An electrical voltage induced due to Faraday's law of induction can be tapped off at the measurement electrodes 103, 104 by means of a measurement and/or evaluation unit. It is at a maximum if the flow measuring probe 101 is installed in the tube line such that a plane spanned by a straight line intersecting the two measurement electrodes 103, 104 and by a longitudinal axis of the flow measuring probe runs perpendicularly to the flow direction 118 or longitudinal axis of the tube line. An operating circuit 107 is electrically connected to the coil arrangement 106, in particular to the coil 113, and is configured to impress a clocked operating signal to the coil 113 in order to thus produce a clocked magnetic field 109. The controller circuit 120 is configured to control at least one of the operating signal parameters of the operating signal such that a function dependent on a self-induction value of the self-induction and on a coil current value of the coil current, in particular on the square of the coil current, does not differ from a predefined setpoint value. According to one embodiment, the function dependent on the first voltage $U_{hold}$, in particular the square of the first voltage $U_{hold}$ and the duration of the second time subinterval $t_{shot}$ is controlled such that both behave in a manner inversely proportional to one another. Alternatively, the determined electrical resistance R of the coil arrangement, or the coil current determined for example during the measurement phase are considered in the determination of the control function.

LIST OF REFERENCE SIGNS

Magneto-inductive flow meter 1
Measuring tube 2
Carrier tube 3
Liner 4
Device for generating a magnetic field 5
Coil 6
Operating circuit 7
Device for tapping off an induced measurement voltage 8
Controller circuit 10
Operating signal 11
Curve 12
Coil core 14
Receptacle of the coil 15
Measurement electrode 17
Measurement electrode 18
Fill-level monitoring electrode 19
Reference electrode 20
Pole shoe 21
Field return 22
Measuring circuit 23
Evaluation circuit 24
Coil arrangement 25
Magneto-inductive flow measuring probe 101
Housing 102
Measurement electrode 103
Measurement electrode 104
Field-conducting arrangement 105
Coil arrangement 106
Operating circuit 107
Magnetic field 109
Field-conducting body 110
Coil core 111
Pole shoe 112
Coil 113
Field return body 114
Front body 115
End section 116
Flow direction of the medium 118
Controller circuit 120

The invention claimed is:

1. A magneto-inductive flow measurement device for determining a flow-rate-dependent measured variable for a flowable medium, comprising:

a device for producing a magnetic field, wherein the device for producing the magnetic field includes a coil arrangement;

a device for tapping off a measurement voltage induced in the flowable medium, including at least two diametrically arranged measurement electrodes; and an operating circuit configured to apply an operating signal having operating signal parameters to the coil arrangement;

a controller circuit configured to control at least one of the operating signal parameters such that a controlled variable does not differ from a predefined setpoint value; and a measuring circuit configured to determine a coil current of the coil arrangement, wherein the setpoint value includes a magnetic field energy of proportional magnitude, wherein the device for producing the magnetic field has a self-induction, and wherein the controlled variable depends on a product of the self-induction and of a square of the coil current.

2. The magneto-inductive flow measurement device according to claim 1, wherein the operating signal has a voltage curve that is variable over time and that is divided into time intervals, wherein a sign of the voltage curve alternates in successive time intervals, and wherein the time intervals each have a first time subinterval in which a first voltage that is constant over the first time subinterval is applied to the device for producing the magnetic field.

3. The magneto-inductive flow measuring device according to claim 2, wherein the measuring circuit is configured to measure the coil current during the first time subinterval, and wherein the controlled operating signal parameter includes a function that depends on the first voltage or on a square of the first voltage, or is the first voltage or the square of the first voltage.

4. The magneto-inductive flow measuring device according to claim 3, wherein the time intervals each have a second time subinterval in which a second voltage that is constant over the second time subinterval is applied to the device for producing the magnetic field, wherein the second voltage is greater than the first voltage, wherein the first time subinterval follows the second time subinterval in the voltage curve, and wherein a duration of the second time subinterval is shorter than a duration of the first time subinterval.

5. The magneto-inductive flow measurement device according to claim 4, wherein a quotient of the first voltage and the second voltage is constant over the voltage curve, wherein the controlled operating signal parameter includes solely the duration of the second time subinterval and a function dependent on the first voltage, wherein the duration of the second time subinterval is a variable and controllable, wherein the controller circuit is configured to control the duration of the second time subinterval and the function that depends on the first voltage such that a control function does not differ from the predefined setpoint value, and wherein the control function depends on a product of the duration of the second time subinterval and the function dependent on the first voltage.

6. The magneto-inductive flow measurement device according to claim 5, wherein the function dependent on the first voltage is inversely proportional to the duration of the second time subinterval.

7. The magneto-inductive flow measurement device according to claim 4, wherein the second voltage is constant over the time intervals, wherein the at least one controlled operating signal parameter comprises the duration of the second time subinterval and a function dependent on the first voltage, wherein the controller circuit is configured to control the duration of the second time subinterval and the function that depends on the first voltage such that a control function does not differ from the predefined setpoint value, and wherein the control function depends on a product of the function dependent on the first voltage and the duration of the second time subinterval.

8. The magneto-inductive flow measurement device according to claim 7, wherein the function dependent on the first voltage is inversely proportional to the duration of the second time subinterval, and wherein the function dependent on the first voltage is likewise dependent on $$\ln\left((U_{shot}+U_{hold})/(U_{shot}-U_{hold})\right),$$

wherein $U_{shot}$ is the second voltage and $U_{hold}$ is the first voltage.

9. The magneto-inductive flow measurement device according to claim 7, wherein the coil current assumes a maximum coil current value in the first time subinterval, and wherein a quotient of the maximum coil current value) and of a coil current determined during the first time subinterval is constant.

10. The magneto-inductive flow measurement device according to claim 4, wherein the coil current assumes a maximum coil current value in the first time subinterval, wherein the at least one controlled operating signal parameter includes the duration of the second time subinterval and the function dependent on the first voltage, wherein the controller circuit is configured to control the duration of the second time subinterval and the function that depends on the first voltage such that a control function does not differ from the setpoint value, and wherein the control function depends on a product of the duration of the second time subinterval and the function dependent on the first voltage and the maximum coil current value.

11. The magneto-inductive flow measurement device according to claim 4, wherein the duration of the second time subinterval, a function dependent on the first voltage, and a function dependent on the second voltage are each a variable and controllable variable, wherein the controller circuit is configured to control the duration of the second time subinterval, the function dependent on the first voltage, and the function dependent on the second voltage such that a control function does not differ from the predefined setpoint value, and wherein the control function depends on the function dependent on the first voltage, on the function dependent on the second voltage, and on the duration of the second time subinterval.

12. The magneto-inductive flow measurement device according to claim 5, wherein the function dependent on the first voltage includes a product of the first voltage and the coil current.

13. The magneto-inductive flow measurement device according to claim 1, further comprising:

an evaluation circuit which is configured to determine an actual value of a function that depends on the self-induction value.

14. The magneto-inductive flow measurement device according to claim 1, wherein the measuring circuit is configured to determine a present actual value of an applied coil voltage at the device for producing the magnetic field, and wherein the present actual value of the applied coil voltage enters the control function.

15. The magneto-inductive flow measurement device according to claim 14, wherein the measuring circuit is configured to determine a present actual value of an electrical resistance of the device for producing the magnetic field, and wherein the control function comprises a function dependent on the square of the first voltage and on the actual value of the electrical resistance.

* * * * *